US009290236B2

(12) United States Patent
Kuwayama et al.

(10) Patent No.: US 9,290,236 B2

(45) Date of Patent: Mar. 22, 2016

(54) BICYCLE FRONT DERAILLEUR

(71) Applicant: SHIMANO INC., Sakai-ku, Sakai, Osaka (JP)

(72) Inventors: Kazuya Kuwayama, Sakai (JP); Atsuhiro Emura, Sakai (JP)

(73) Assignee: SHIMANO INC., Sakai (JP)

( * ) Notice: Subject to any disclaimer, the term of this patent is extended or adjusted under 35 U.S.C. 154(b) by 205 days.

(21) Appl. No.: 13/780,482

(22) Filed: Feb. 28, 2013

(65) Prior Publication Data

US 2014/0243126 A1 Aug. 28, 2014

(51) Int. Cl.

| | |
|---|---|
| ***B62M 9/132*** | (2010.01) |
| ***B62M 9/1342*** | (2010.01) |
| ***F16B 37/14*** | (2006.01) |

(52) U.S. Cl.

CPC ............. *B62M 9/132* (2013.01); *B62M 9/1342* (2013.01); *F16B 37/145* (2013.01)

(58) Field of Classification Search

CPC ........ F16B 37/14; F16B 37/145; B26B 13/28

USPC ............................... 474/80, 82, 144; 411/338

See application file for complete search history.

(56) References Cited

U.S. PATENT DOCUMENTS

| | | | | |
|---|---|---|---|---|
| 1,096,070 | A * | 5/1914 | Stull | 220/243 |
| 3,289,296 | A * | 12/1966 | Hedstrom et al. | 30/267 |
| 3,414,304 | A * | 12/1968 | Miller | 403/408.1 |
| 4,490,083 | A * | 12/1984 | Rebish | 411/338 |
| 4,826,378 | A * | 5/1989 | Pamer et al. | 411/338 |
| 4,889,458 | A * | 12/1989 | Taylor | 411/383 |
| 5,068,956 | A * | 12/1991 | Malewicz | 29/437 |
| 6,126,355 | A * | 10/2000 | Clover, Jr. | 403/13 |
| 6,146,298 | A * | 11/2000 | Nanko | 474/80 |
| 6,234,927 | B1 * | 5/2001 | Peng | 474/82 |
| 6,629,903 | B1 * | 10/2003 | Kondo | 474/82 |
| 7,857,567 | B2 * | 12/2010 | Iwata | B62D 25/147 411/433 |
| 8,434,982 | B2 * | 5/2013 | Henriksen, Jr. | 411/338 |
| 2006/0189422 | A1 * | 8/2006 | Ichida et al. | 474/80 |
| 2008/0004142 | A1 * | 1/2008 | Nakai et al. | 474/80 |
| 2008/0300076 | A1 * | 12/2008 | Fukushima et al. | 474/80 |
| 2009/0169324 | A1 * | 7/2009 | Fritsch | 411/4 |
| 2010/0107420 | A1 * | 5/2010 | Makoto | 30/201 |

* cited by examiner

*Primary Examiner* — Minh Truong

(74) *Attorney, Agent, or Firm* — Jeffer Mangels, Butler & Mitchell LLP; Brennan C. Swain, Esq.

(57) ABSTRACT

A bicycle front derailleur includes abase member configured to be attached to a bicycle frame, a chain guide configured to engage a chain, a connecting structure that connects the chain guide to the base member such that the chain guide can move relative to the base member, and an attachment structure detachably attaching the chain guide to the connecting structure and/or the connecting structure to the base member.

23 Claims, 4 Drawing Sheets

BICYCLE FRONT DERAILLEUR

FIELD OF THE INVENTION

The present invention relates to a bicycle front derailleur, and more specifically to a bicycle front derailleur with a detachable chain guide.

BACKGROUND OF THE INVENTION

Bicycle front derailleurs are well known in the art and typically include a chain guide that moves the chain from one sprocket to another sprocket in response to the rider's operation. There exists a need for an improved bicycle front derailleur.

SUMMARY OF THE PREFERRED EMBODIMENTS

In accordance with a first aspect of the present invention there is provided a bicycle front derailleur that includes a base member configured to be attached to a bicycle frame, a chain guide configured to engage a chain, a connecting structure that connects the chain guide to the base member such that the chain guide can move relative to the base member, and an attachment structure detachably attaching the chain guide to the connecting structure and/or the connecting structure to the base member. In a preferred embodiment, the attachment structure detachably attaches the chain guide to the connecting structure. Preferably, the attachment structure includes a first attachment member that includes a first part and a second part, and one of the chain guide or the connecting structure is clamped between the first part and the second part. In a preferred embodiment, the first part of the first attachment member includes a shaft portion and a head portion and the second part of the first attachment member includes a cylindrical portion. The shaft portion of the first part is threadingly received in the cylindrical portion of the second part so as to clamp either the chain guide or the connecting structure between the head portion of the first part and the cylindrical portion of the second part.

In a preferred embodiment, the connecting structure includes a first link member, and one of the chain guide and the first link member is clamped between the first part and the second part of the first attachment member. Preferably, the chain guide is clamped between the first part and the second part of the first attachment member. In a preferred embodiment, the second part of the first attachment member further includes a head portion. The first link is pivotally arranged around the cylindrical portion and is positioned between the chain guide and the head portion of the second part of the first attachment member. Preferably, the derailleur also includes a first bushing disposed in a radial direction between the cylindrical portion of the first attachment member and the first link member.

In a preferred embodiment, the attachment structure includes a second attachment member that includes a first part and a second part, and the connecting structure further includes a second link member so as to form a four bar linkage between the base member and the chain guide. One of the chain guide or the second link member is clamped between the first part and the second part of the second attachment member. Preferably, the first part of the second attachment member includes a shaft portion and a head portion, and the second part of the second attachment member includes a cylindrical portion. The shaft portion of the first part is threadingly received in the cylindrical portion of the second part so as to clamp either one of the chain guide and the second link member between the head portion of the first part and the cylindrical portion of the second part. Preferably, the chain guide is clamped between the first part and the second part of the first attachment member and between the first part and the second part of the second attachment member. In a preferred embodiment, the second part of the first attachment member further includes a head portion and the second part of the second attachment member further includes a head portion. The first link is pivotally arranged around the cylindrical portion and is positioned between the chain guide and the head portion of the second part of the first attachment member, and the second link member is pivotally arranged around the cylindrical portion and is positioned between the chain guide and the head portion of the second part of the second attachment member. In a preferred embodiment, if the attachment connecting structure includes two attachment members, the derailleur includes a first bushing disposed in a radial direction between the cylindrical portion of the first attachment member and the first link member, and a second bushing disposed in a radial direction between the cylindrical portion of the second attachment member and the second link member.

In another preferred embodiment, the attachment structure includes first, second and third attachment members. The third attachment member includes a first part and a second part, and one of the chain guide and the first link member is clamped between the first part and the second part of the third attachment member. The first part of the third attachment member includes a shaft portion and a head portion, and the second part of the third attachment member includes a cylindrical portion. The shaft portion of the first part is threadingly received in the cylindrical portion of the second part so as to clamp either of the chain guide or the first link member between the head portion of the first part and the cylindrical portion of the second part. Preferably, the chain guide (i.e., the protrusions thereof) are clamped between the first part and the second part of the first attachment member, between the first part and the second part of the second attachment member, and between the first part of the second part of the third attachment member. In this embodiment, the second part of the first attachment member further includes a head portion, the second part of the second attachment member further includes a head portion, and the second part of the third attachment member further includes a head portion. The first link is pivotally arranged around the cylindrical portion and is positioned between the chain guide and the head portion of the second part of the first attachment member. The second link member is pivotally arranged around the cylindrical portion and is positioned between the chain guide and the head portion of the second part of the second attachment member. The first link is pivotally arranged around the cylindrical portion and is positioned between the chain guide and the head portion of the second part of the third attachment member. In this embodiment, the derailleur includes a first bushing disposed in a radial direction between the cylindrical portion of the first attachment member and the first link member, a second bushing disposed in a radial direction between the cylindrical portion of the second attachment member and the second link member, and a third bushing disposed in a radial direction between the cylindrical portion of the third attachment member and the first link member.

In a preferred embodiment, the bicycle front derailleur includes an electric motor unit that is configured to move the chain guide and is operatively coupled to the connecting structure. Preferably, the electric motor unit is operatively coupled to the first link member. Preferably, the electric motor unit is mounted to the base member.

The invention, together with additional features and advantages thereof, may be best understood by reference to the following description.

BRIEF DESCRIPTION OF THE DRAWINGS

Like numerals refer to like parts throughout the several views of the drawings.

DETAILED DESCRIPTION OF THE PREFERRED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
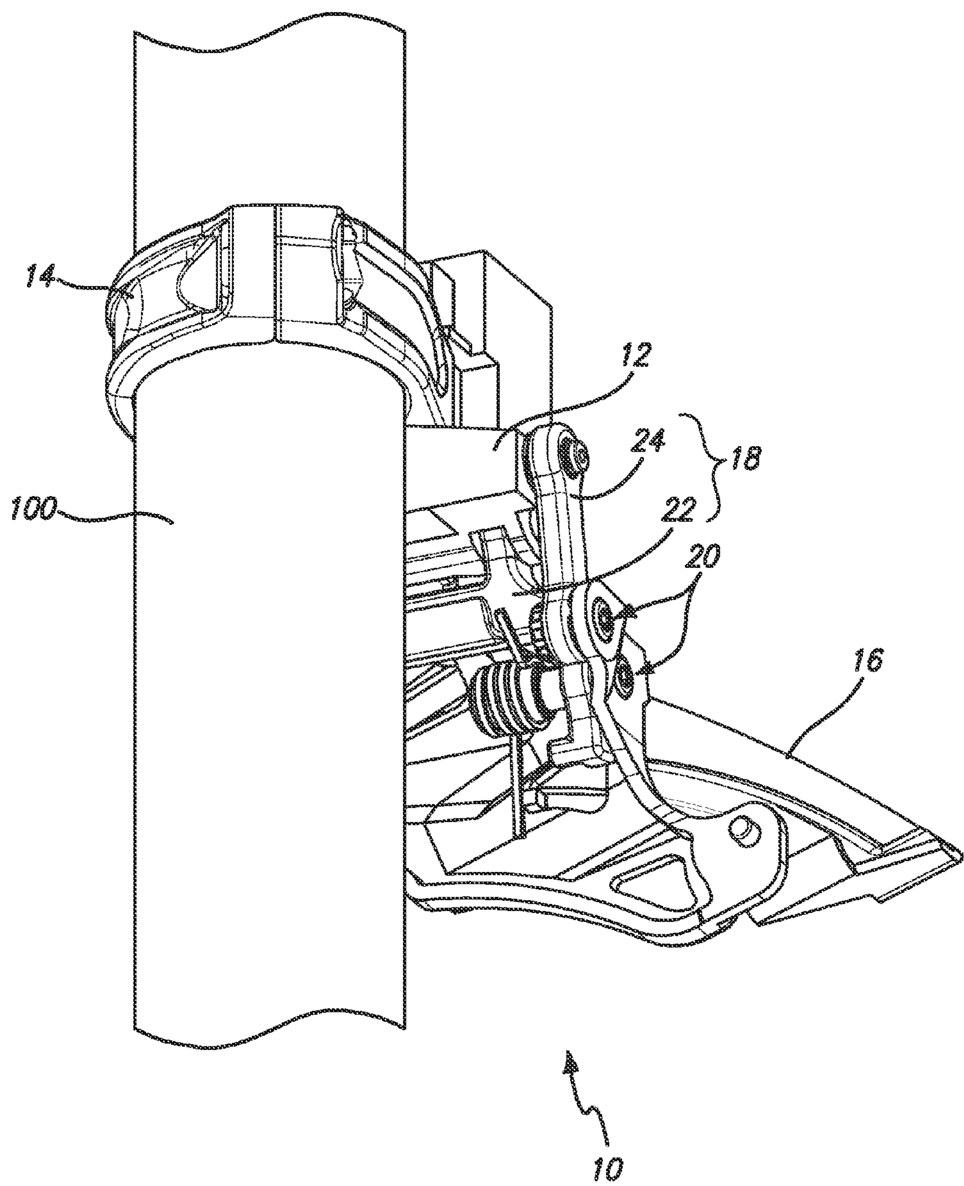
FIG. 1 is a perspective view of a bicycle front derailleur attached to a bicycle frame in accordance with a preferred embodiment of the present invention.

Referring to FIG. 1, a bicycle front derailleur 10 generally comprises a base member 12 having a mounting portion 14, a chain guide 16, a connecting structure 18, and an attachment structure 20 detachably attaching the chain guide 16 to the connecting structure 18. The mounting portion 14 is detachably attached to the base member 12. In another embodiment, the mounting portion 14 can be formed as a unitary structure with the base member 12. The mounting portion 14 clamps onto a bicycle frame 100 to attach the bicycle front derailleur 10 to the bicycle frame 100. It will be understood that the threaded fastener from the mounting portion 14 is omitted in FIG. 1. Although the mounting portion 14 is illustrated as a clamp member in this embodiment, any type of mounting portion that attaches the bicycle front derailleur 10 to the frame 100 is within the scope of the present invention.

Figure 2:
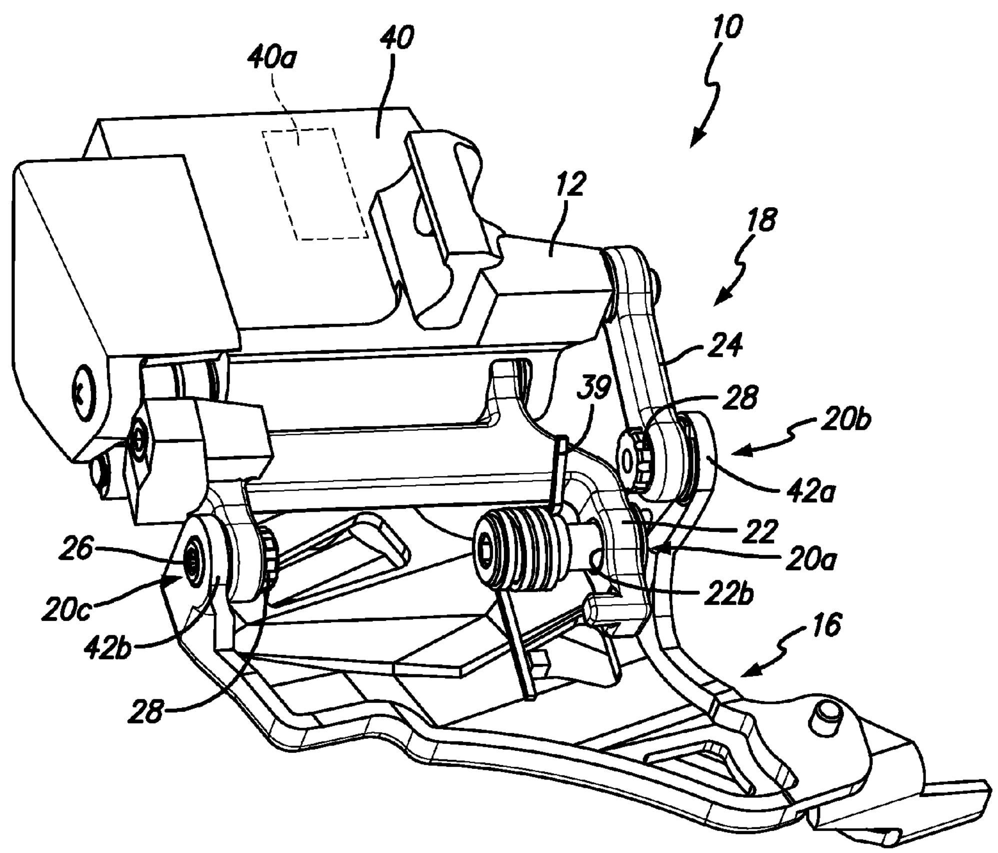
FIG. 2 is a perspective view of the bicycle front derailleur of FIG. 1 with the mounting portion omitted.
Figure 3:
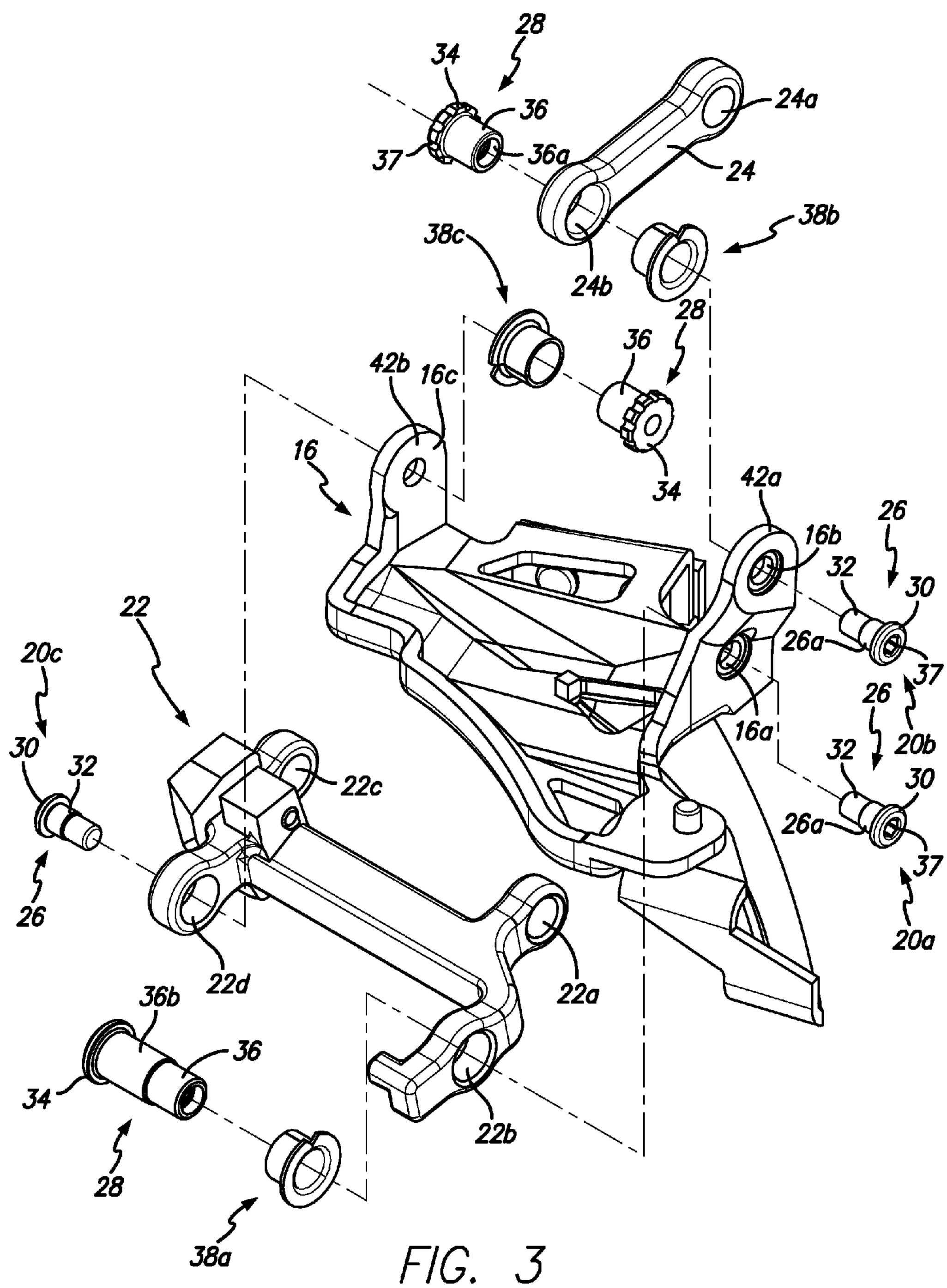
FIG. 3 is a perspective view of a portion of the bicycle front derailleur of FIG. 1 showing an attachment structure exploded therefrom.

The connecting structure 18 connects the chain guide 16 to the base member 12 such that the connecting structure 18 allows the chain guide 16 to move relative to the base member 12. In a preferred embodiment, the connecting structure 18 includes a first link member 22 and a second link member 24. The chain guide 16 is detachably attached to the first and second link members 22 and 24 by the attachment structure 20. Referring to FIGS. 2-3, the attachment structure 20 includes a first attachment member 20*a*, a second attachment member 20*b* and a third attachment member 20*c*. In another embodiment, the attachment structure (e.g., any one or more attachment members) can detachably attach the connecting structure 18 to the base member 12.

Figure 4:
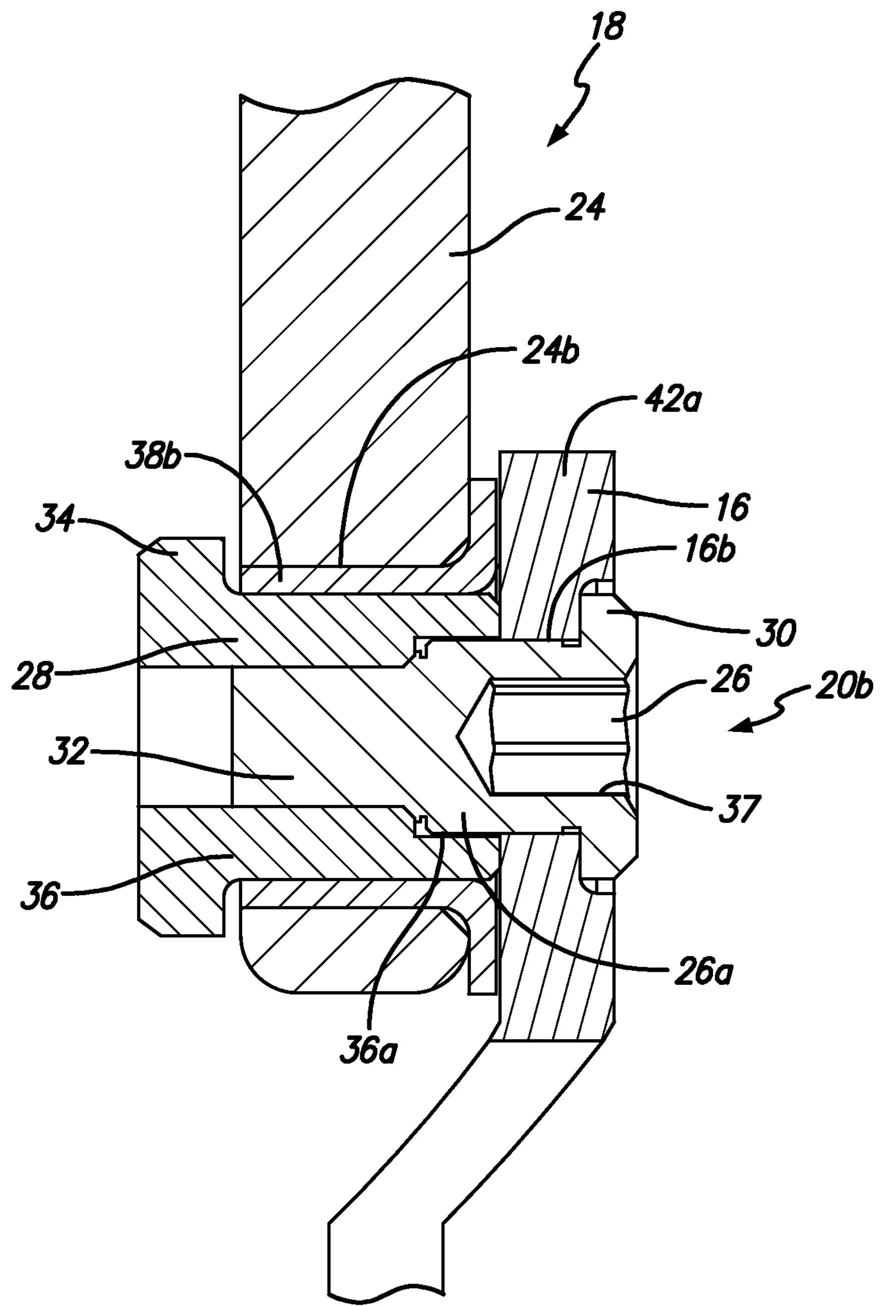
FIG. 4 is a cross-sectional view of an attachment member attaching a portion of the chain guide to the connecting structure.

As shown in FIGS. 3-4, the first, second and third attachment members 20*a*, 20*b* and 20*c* each include a first part 26 and a second part 28, respectively. Preferably, the first part 26 includes a head portion 30 and an externally threaded shaft portion (hereinafter "shaft portion") 32 and the second part 28 includes a head portion 34 and an internally threaded cylindrical portion (hereinafter "cylindrical portion") 36. The shaft portion 32 is received in the cylindrical portion 36 and a portion of the chain guide 16 is clamped between the first part 26 and the second part 28. In another embodiment, the connecting structure 18, and, in particular, one of the first and second link members 22 and 24 or both can be clamped between the first part 26 and the second part 28. In particular, the shaft portion 32 of the first part 26 is threadingly received in the cylindrical portion 36 so as to clamp the portion of the chain guide 16 between the head portion 30 of the first part 26 and the distal end of the cylindrical portion 36 of the second part 28. In a preferred embodiment, as shown in FIGS. 3-4, the head portion 30 of the first part 26 includes a protruding portion 26*a* that is received in a non-threaded portion 36*a* of the cylindrical portion 36.

As shown in FIG. 3, in a preferred embodiment, the first part 26 and the second part 28 include a tool engagement portion 37, such as an exterior tool engagement surface (see the head portion 34 of the second part 28) or a tool engagement opening (see the head portion 30 of the first part 26).

In a preferred embodiment, the first link member 22 includes pivot openings 22*a* and 22*b* defined therein. The pivot opening a provides for pivotal attachment of the first link member 22 to the base member 12 and pivot opening 22*b* provides for pivotal attachment of the first link member 22 to the chain guide 16. In a preferred embodiment, the first attachment member 20*a* is received in and extends through the pivot opening 22*b* and a pivot opening 16*a* defined in the chain guide 16. In a preferred embodiment, the second link member 24 includes pivot openings 24*a* and 24*b* defined therein. The pivot opening 24*a* provides for pivotal attachment of the second link member 24 to the base member 12 and the pivot opening 24*b* provides for pivotal attachment of the second link member 24 to the chain guide 16. In a preferred embodiment, the second attachment member 20*b* is received in and extends through the pivot opening 24*b* and a pivot opening 16*b* defined in the chain guide 16. In a preferred embodiment, the first link member 22 also includes pivot openings 22*c* and 22*d* defined therein. In another embodiment, these pivot openings can be defined in a separate, third link. The pivot opening 22*c* provides for pivotal attachment of the first link member 22 to the base member 12 and the pivot opening 22*d* provides for pivotal attachment of the first link member 22 to the chain guide 16. In a preferred embodiment, the third attachment member 20*c* is received in and extends through the pivot opening 22*d* and a pivot opening 16*c* defined in the chain guide 16.

With the above described arrangement, as shown in FIG. 4, the second link member 24 is pivotally arranged around the cylindrical portion 36 and is positioned between the chain guide 16 and the head portion 34 of the second part 28. Although only the second attachment member 20*b* is shown in FIG. 4, it will be understood by those skilled in the art that there is a similar arrangement between the first and third attachment members 20*a* and 20*c* and the chain guide 16 and the first link member 22.

It will be understood that the bicycle front derailleur 10 can include between one and four attachment members. In a preferred embodiment, as shown in FIG. 2, the derailleur includes the first, second and third attachment members 20*a*, 20*b* and 20*c*. It will be appreciated by those skilled in the art that the first and second link members 22 and 24 (the connecting structure 18), which link the base member 12 and the chain guide 16, form a four bar linkage between the base member 12 and the chain guide 16, which provides movement of the chain guide 16 to allow shifting. The connecting structure 18 can include third and/or fourth link members or the first link member 22 can include additional pivot points or openings for more than one additional attachment member.

Any combination of link members and attachment members to form a linkage, preferably a four bar linkage, is within the scope of the present invention. Furthermore, as is shown in FIGS. 2-3, the chain guide 16 includes a series (preferably a pair) of flanges or protrusions 42*a* and 42*b*. The pivot openings 16*a* and 16*b* are defined in flange 42*a* and the pivot opening 16*c* is defined in flange 42*b*.

In a preferred embodiment, a first bushing 38*a* is disposed in a radial direction between the cylindrical portion 36 of the first attachment member 20*a* and the first link member 22. A second bushing 38*b* is disposed in a radial direction between the cylindrical portion 36 of the second attachment member 20*b* and the second link member 24. A third bushing 38*c* is disposed in a radial direction between the cylindrical portion 36 of the third attachment member 20*c* and the first link member 22. As shown in FIG. 3, in this embodiment of the invention, the second part 28 of the first attachment member 20*a* can include an elongated cylindrical portion 36*b* between the head portion 34 and the cylindrical portion 36. As shown in FIG. 2, a spring 39 is mounted on the elongated cylindrical portion 36*b*.

As shown in FIG. 2, in a preferred embodiment, the bicycle front derailleur 10 includes an electric motor unit 40 that includes a motor 40*a*. The electric motor unit is operatively coupled to the connecting structure 18 to move the chain guide 16. More specifically, the electric motor unit 40 can be operatively connected to one of the first link member 22 or the second link member 24 or both. Preferably, the electric motor unit 40 is mounted to the base member 12. However, this is not a limitation and the electric motor unit 40 can be mounted elsewhere.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. The term "mounted" or "mounting," as used herein, encompasses configurations in which an element directly secured to another element by affixing the element is directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "attached", "bonded", "fixed" and their derivatives. Also, the terms "part," "section," "portion," "member" or "element" when used in the singular can have the dual meaning of a single part or a plurality of parts. As used herein to describe the above embodiment(s), the following directional terms "forward," "rearward," "rightward," "leftward," "outward," "inward," "downward," "upward," "above," "below," "vertical," "horizontal," and "transverse" as well as any other similar directional terms refer to those directions of a bicycle equipped with the bicycle front derailleur. Accordingly, these terms, as utilized to describe the bicycle front derailleur should be interpreted relative to a bicycle equipped with the bicycle front derailleur as used in the normal riding position on a level surface. Finally, terms of degree such as "substantially," "about" and "approximately" as used herein mean a reasonable amount of deviation of the modified term such that the end result is not significantly changed.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A bicycle front derailleur comprising:

a base member configured to be attached to a bicycle frame, a chain guide configured to engage a chain, a connecting structure that connects the chain guide to the base member such that the chain guide can move relative to the base member, an attachment structure detachably attaching the chain guide to the connecting structure, wherein the attachment structure includes a first attachment member that includes a first part and a second part, wherein one of the chain guide and the connecting structure is clamped between the first part and the second part, wherein the first part includes a tool engagement portion that faces an outside of the chain guide, wherein the first part of the first attachment member includes a shaft portion and a head portion and the second part of the first attachment member includes a head portion and a cylindrical portion having an end surface, wherein the head portion and the end surface are located on opposite ends of the cylindrical portion, wherein the shaft portion of the first part is threadingly received in the cylindrical portion of the second part so as to clamp the one of the chain guide and the connecting structure between the head portion of the first part and the end surface of the cylindrical portion of the second part, the cylindrical portion of the second part having a constant outer diameter extending from the head portion of the second part to the end surface of the cylindrical portion when the first part is threadingly received in the second part, wherein the first part of the attachment structure can be detachably attached from the second part, and wherein detachably attached comprises threadingly disengaging the shaft portion of the first part from the cylindrical portion of the second part and then threadingly reengaging the same shaft portion of the first part with the cylindrical portion of the second part, wherein the head portion of the first part of the first attachment member includes a protruding portion, wherein the cylindrical portion of the second part of the first attachment member includes a non-threaded portion that has a diameter that is larger than the shaft portion of the first part, and wherein the protruding portion is received in the non-threaded portion.

2. The bicycle front derailleur of claim 1 wherein the connecting structure includes a first link member, and wherein one of the chain guide and the first link member is clamped between the first part and the second part of the first attachment member.

3. The bicycle front derailleur of claim 2 wherein the chain guide is clamped between the first part and the second part of the first attachment member.

4. The bicycle front derailleur of claim 3 wherein the first link is pivotally arranged around the cylindrical portion and is positioned between the chain guide and the head portion of the second part of the first attachment member.

5. The bicycle front derailleur of claim 4 further comprising a first bushing disposed in a radial direction between the cylindrical portion of the first attachment member and the first link member.

6. The bicycle front derailleur of claim 5 wherein the first bushing includes a flange extending radially outwardly therefrom, and wherein the flange is positioned between the connecting structure and the chain guide.

7. The bicycle front derailleur of claim 4 wherein the head portion of the second part extends outwardly from the connecting structure and includes a tool engagement portion on an outer surface thereof that is accessible from an inside of the chain guide.

8. The bicycle front derailleur of claim 5 wherein the bushing includes an inner diameter that has a constant diameter in an axial direction.

9. The bicycle front derailleur of claim 2 wherein the attachment structure further includes a second attachment member that includes a first part and a second part, wherein the connecting structure further includes a second link member so as to form a four bar linkage between the base member and the chain guide, and wherein one of the chain guide and the second link member is clamped between the first part and the second part of the second attachment member.

10. The bicycle front derailleur of claim 9 wherein the first part of the second attachment member includes a shaft portion and a head portion, and the second part of the second attachment member includes a cylindrical portion, wherein the shaft portion of the first part is threadingly received in the cylindrical portion of the second part so as to clamp the one of the chain guide and the second link member between the head portion of the first part and the cylindrical portion of the second part.

11. The bicycle front derailleur of claim 10 wherein the chain guide is clamped between the first part and the second part of the first attachment member and between the first part and the second part of the second attachment member.

12. The bicycle front derailleur of claim 11 wherein the first link is pivotally arranged around the cylindrical portion and is positioned between the chain guide and the head portion of the second part of the first attachment member, wherein the second part of the second attachment member further includes a head portion, and wherein the second link member is pivotally arranged around the cylindrical portion and is positioned between the chain guide and the head portion of the second part of the second attachment member.

13. The bicycle front derailleur of claim 12 further comprising a first bushing disposed in a radial direction between the cylindrical portion of the first attachment member and the first link member, and a second bushing disposed in a radial direction between the cylindrical portion of the second attachment member and the second link member.

14. The bicycle front derailleur of claim 9 wherein the attachment structure further includes a third attachment member that includes a first part and a second part, and wherein the one of the chain guide and the first link member is clamped between the first part and the second part of the third attachment member.

15. The bicycle front derailleur of claim 14 wherein the first part of the third attachment member includes a shaft portion and a head portion, and the second part of the third attachment member includes a cylindrical portion, wherein the shaft portion of the first part is threadingly received in the cylindrical portion of the second part so as to clamp the one of the chain guide and the first link member between the head portion of the first part and the cylindrical portion of the second part.

16. The bicycle front derailleur of claim 15 wherein the chain guide is clamped between the first part and the second part of the first attachment member, between the first part and the second part of the second attachment member, and between the first part and the second part of the third attachment member.

17. The bicycle front derailleur of claim 16 wherein the first link is pivotally arranged around the cylindrical portion and is positioned between the chain guide and the head portion of the second part of the first attachment member, wherein the second part of the second attachment member further includes a head portion, wherein the second link member is pivotally arranged around the cylindrical portion and is positioned between the chain guide and the head portion of the second part of the second attachment member, wherein the second part of the third attachment member further includes a head portion, and wherein the first link is pivotally arranged around the cylindrical portion and is positioned between the chain guide and the head portion of the second part of the third attachment member.

18. The bicycle front derailleur of claim 17 further comprising a first bushing disposed in a radial direction between the cylindrical portion of the first attachment member and the first link member, a second bushing disposed in a radial direction between the cylindrical portion of the second attachment member and the second link member, and a third bushing disposed in a radial direction between the cylindrical portion of the third attachment member and the first link member.

19. The bicycle front derailleur of claim 2 further comprising an electric motor unit that is configured to move the chain guide and is operatively coupled to the first link member.

20. The bicycle front derailleur of claim 19 wherein the electric motor unit is mounted to the base member.

21. The bicycle front derailleur of claim 1 further comprising an electric motor unit that is configured to move the chain guide and is operatively coupled to the connecting structure.

22. The bicycle front derailleur of claim 21 wherein the electric motor unit is mounted to the base member.

23. The bicycle front derailleur of claim 1 wherein the one of the chain guide and the connecting structure that is clamped between the head portion of the first part and the end surface of the cylindrical portion of the second part includes a pivot opening defined therein having an inner diameter, and wherein the head portion of the first part of the first attachment member has an outer diameter that is greater than the inner diameter of the pivot opening.

* * * * *